US006895152B2

(12) United States Patent
Sumida et al.

(10) Patent No.: US 6,895,152 B2
(45) Date of Patent: May 17, 2005

(54) GUIDED-MODE LASER APPARATUS WITH IMPROVED CLADDING STRUCTURE AND A METHOD OF FABRICATING THEREOF

(75) Inventors: David S. Sumida, Los Angeles, CA (US); Hans W. Bruesselbach, Monte Nido, CA (US); Alexander A. Betin, Manhattan Beach, CA (US)

(73) Assignee: HRL Laboratories, LLC, Malibu, CA (US)

(*) Notice: Subject to any disclaimer, the term of this patent is extended or adjusted under 35 U.S.C. 154(b) by 72 days.

(21) Appl. No.: 09/894,347

(22) Filed: Jun. 28, 2001

(65) Prior Publication Data

US 2003/0012534 A1 Jan. 16, 2003

(51) Int. Cl.$^7$ .................................................. G02B 6/16
(52) U.S. Cl. ......................... 385/123; 385/126; 385/142; 372/6; 372/40
(58) Field of Search ................................ 385/123, 126; 372/6, 40

(56) References Cited

U.S. PATENT DOCUMENTS

| | | | |
|---|---|---|---|
| 5,048,026 A | * 9/1991 | Shaw et al. | 372/6 |
| 5,852,622 A | 12/1998 | Meissner et al. | 372/39 |
| 5,936,984 A | * 8/1999 | Meissner et al. | 372/34 |
| 6,055,260 A | 4/2000 | Byren et al. | 372/72 |
| 6,160,824 A | 12/2000 | Meissner et al. | 372/7 |
| 6,288,833 B1 | * 9/2001 | Kasamatsu | 359/333 |
| 6,324,326 B1 | * 11/2001 | Dejneka et al. | 385/123 |

FOREIGN PATENT DOCUMENTS

| | | |
|---|---|---|
| EP | 0 801 449 A2 | 10/1997 |
| WO | 01/24325 A1 | 4/2001 |

OTHER PUBLICATIONS

Sumida, D., et al., "Diode–pumped Yb:YAG catches up with Nd:YAG," *Laser Focus World*, 4 pages (Jun. 1999).
Sumida, D., et al., "Spectroscopy and Diode–Pumped Lasing of $Yb^{3+}$–Doped $Lu_3Al_5O_{12}$ (Yb:LuAG)," *OSA Proceedings on Advanced Solid–State Lasers*, vol. 24, B. Chai and S. Payne, eds., pp. 348–350 (1995).

* cited by examiner

Primary Examiner—John D. Lee
Assistant Examiner—Sung Pak
(74) Attorney, Agent, or Firm—Ladas & Parry LLP

(57) ABSTRACT

A solid state waveguided structure a core fabricated of a lasing medium, diffusion-bonded to a cladding fabricated of a laser-inactive material. The medium of the core comprises a lutetium-aluminum-garnet material doped with ions of ytterbium, lutetium-aluminum-garnet material doped with ions of neodymium, and lutetium-aluminum-garnet material doped with ions of thulium, and the laser-inactive material of the cladding comprises an yttrium-aluminum-garnet material. A method of fabricating a solid state waveguided structure with improved characteristics comprising using a combination of a trivalent ions of ytterbium-doped lutetium-aluminum-garnet core and a yttrium-aluminum-garnet cladding.

26 Claims, 2 Drawing Sheets

GUIDED-MODE LASER APPARATUS WITH IMPROVED CLADDING STRUCTURE AND A METHOD OF FABRICATING THEREOF

I. BACKGROUND OF THE INVENTION

1. Field of the Invention

This invention relates to the field of crystalline materials to be used in fabrication of the core and the cladding of diffusion bonded optics. More particularly, it pertains to the use of undoped yttrium aluminum garnet (hereinafter, YAG) for the fabrication of the cladding, and of doped lutetium aluminum garnet (hereinafter, LuAG) for the fabrication of the core, the core being a rod completely surrounded by the cladding on all sides including the ends of the rod.

2. Description of the Related Art

Many modern waveguided structures comprise a core diffusion-bonded to cladding in which this core is completely ensconced (except for the ends). Prior art for such structures incorporated sapphire as the cladding material. For example, U.S. Pat. No. 5,852,622 to Meissner et. al., teaches a system for improving the thermal uniformity of composite solid state lasers which system also gives these lasers some other advantageous properties. Some embodiments of Meissner's invention use sapphire as the cladding material.

For high-brightness, high-power laser systems, a traditionally preferred approach, in order to maintain a good beam quality, is use of a phase-conjugate master oscillator power amplifier (MOPA) laser architecture. For maximum flexibility in power scaling and pulse format, guided wave amplifiers in a loop architecture phase conjugotor based on thermal non-lineary interaction have been previously chosen.

In specific examples of prior art, the ytterbium-doped YAG core was used as the gain medium. Sapphire cladding was used to establish guiding and to achieve thermal robustness. See, e.g., Sumida, et. al. "Diode-Pumped Yb:YAG Catches Up With Nd:YAG," Laser Focus World, June 1999.

While the design employing the ytterbium-doped YAG core and sapphire cladding is a viable design having some advantages and positive sides, it also has several problems and drawbacks. Both advantages and disadvantages of such prior art design are discussed hereinbelow.

Laser guiding, via total internal reflection (TIR), takes place when the refractive index of the core is larger than that of the cladding. TIR occurs when the angle of incidence is larger than the critical angle $\theta_{critical}$, where $\theta_{critical}$ is determined from the equation in $\theta_{critical} = n_{cladding}/n_{core}$, where $n_{cladding}$ and $n_{core}$ are refractive indices of the cladding and the core, respectively.

It follows from the foregoing that the angular spread of what is guided depends on the difference in the refractive indices, and the advantages of sapphire include its much lower refractive index relative to YAG (1.76 and 1.82, respectively).

In addition, sapphire has superior thermal conductivity compared to that of YAG (about 35 Watts per meter per Kelvin for sapphire compared to 10 Watts per meter per Kelvin for YAG), which is important to facilitate the removal of heat from the YAG core.

However, this prior art design employing sapphire had serious disadvantages, particularly in that it caused difficulties with the six sided bonding using sapphire. The dissimilar crystalline and mechanical properties make the practical fabrication of diffusion-bonded fully encased sapphire and YAG composite structures very difficult. Those skilled in the art are aware that the manufacturing of diffusion-bonded ytterbium-doped YAG-sapphire composites, promoted by onyx Optics, Inc. of Dublin, Calif., albeit successful, has proved to be very time-consuming as well as very expensive undertaking.

Specifically, because the polishing rate for the two materials is different, it is very difficult to obtain an adequately flat optical finish over a sapphire-YAG-sapphire composite surface.

Another drawback of the sapphire-based technology is that according to this technology it is essential to obtain surface free of scratches, gaps, voids, inclusions, digs and similar mechanical imperfections in preparing the surface for any subsequent bonding steps. Although this disadvantage may characterize any known diffusion bonding technique, in the case of YAG it is mitigated because it is easier to polish YAG than to polish sapphire.

Also, the crystalline axis of the sapphire (a uniaxial crystal) must be oriented in a particular direction relative to the YAG interface for reliable diffusion bonding. A simple geometrical analysis shows that this preferred orientation is not possible for bonding on all six sides. Hence in practice, a YAG core fully encased in sapphire cladding is very difficult to manufacture.

In view of the foregoing problems and disadvantages inherent in composite structures having sapphire cladding, there exists, therefore, a need for an improved waveguided structure. Such structure should comprise a core encased in cladding, and diffusion-bonded thereto, allowing to use more economical bonding, where a solid endcap is easily bonded to the composite core-cladded endface. The structure should also have acceptable entendue, provide better extraction of energy from the device and be more thermally robust.

There exists no known prior art describing a waveguided structure having all the advantages and benefits described above. Yet the need for such is acute. The present invention discloses such structure and method of fabrication thereof.

II. SUMMARY OF THE INVENTION

This invention is specifically applicable to diode-pumped solid-state laser technology, including high brightness solid-state lasers, and to guided optical amplifiers.

A specific embodiment of the present invention uses undoped YAG as the material for making the cladding and uses ytterbium or neodymium-doped LuAG as the material for the fabrication of the core, the core being completely surrounded by the cladding on all sides including the ends of the rod.

LuAG has a slightly higher refractive index than YAG, so optical guiding occurs. The Yb-doped LuAG has the same general absorption and emission characteristics as the prior-art Yb-doped YAG core. Because both YAG and LuAG are aluminum garnets, they are quite similar in physical, optical, and thermomechanical properties. Hence, it is significantly easier to achieve diffusion-bonding of this composite than the bonding of YAG to sapphire described in prior art. Use of these materials for the core and the cladding makes diffusion-bonding fabrication processes significantly easier while maintaining adequate, waveguiding and spectral characteristics.

This invention provides the following improvements over the prior art.

1. By using a cladding material, physical and thermomechanical properties of which, such as linear-thermal expansion, are nearly ideally matched to the core material, this invention allows much more economical diffusion bonding.

2. Furthermore, this nearly ideal match allows to fabricate a waveguide whose endcaps are made of a solid piece of the cladding material. This allows reducing the fluence/intensity at the ends of the end-pumped composite rod to thereby a reduced risk of coating damage. In the prior art, a solid endcap is very difficult to bond to the composite core-cladded endface.

3. The doped-LuAG refractive index is higher than the undoped YAG cladding so that waveguiding is maintained, at adequate light-gathering capacity (entendue) compared to the prior art YAG/sapphire interface.

4. For ytterbium-doped laser applications, the spectral characteristic of ytterbium-doped LuAG are superior to Yb-doped YAG in that the emission cross section is 30% higher. See, D. Sumida, T. Y. Fan, and R. Hutcheson, *OSA Proceedings on Advanced Solid-State Lasers*, 1995 Vol. 24, B. Chai and S. Payne, eds., pp. 348–350.

For pulsed laser applications, where the energy fluence dominates the laser energy extraction efficiency, this higher stimulated emission cross-section means that the pulsed energy saturation threshold is 30% lower.

Therefore it is easier to extract energy from ytterbium-doped LUAG core for a given set of parameters compared to ytterbium-doped YAG core used in prior art. Other key spectral parameters are also maintained on good levels when the materials of this invention are used to fabricate the device. For instance, the absorption cross-section of the ytterbium-doped LUAG core is comparable to that of the ytterbium-doped YAG core used in prior art. The fluorescence lifetimes of the two materials are also very close at 925 $\mu$s and 951 $\mu$s, respectively.

5. The thermal expansion coefficient of LuAG is slightly larger than that of YAG. Therefore, under thermal load, LuAG is under compressive stress, which means the design is more thermally robust than if the core were under tensile stress.

Other particular embodiments of this invention may benefit by any or all of these improvements depending on the specific selection of lasing medium and cladding material. Criteria for such selection and the materials selected are discussed subsequently.

One aspect of this invention provides a solid state waveguided structure comprising a core fabricated of a lasing medium, the core having an outer surface, and a cladding fabricated of a laser-inactive material, said cladding diffusion-bonded to the outer surface of the core, wherein the lasing medium of the core comprises a crystalline or a glass material, preferably, a lutetium-aluminum-garnet material doped with ions, preferably, with ions of ytterbium, lutetium-aluminum-garnet material doped with ions of neodymium, and lutetium-aluminum-garnet material doped with ions of thulium, and the laser-inactive material of the cladding comprises an yttrium-aluminum-garnet material.

Another aspect of this invention provides a method of fabricating a solid state waveguided structure with improved characteristics, comprising steps of providing a core fabricated of a lasing medium, the core having an outer surface, and ensconcing the core in a cladding fabricated of a laser-inactive material, the cladding diffusion-bonded to the outer surface of the core, wherein the lasing medium of the core comprises a crystalline or a glass material, preferably, a lutetium-aluminum-garnet material doped with ions, preferably, ions of ytterbium, lutetium-aluminum-garnet material doped with ions of neodymium, and lutetium-aluminum-garnet material doped with ions of thulium, and the laser-inactive material of the cladding comprises an yttrium-aluminum-garnet material.

III. BRIEF DESCRIPTION OF THE DRAWINGS

The features and advantages of the present invention will become better understood with regard to the following description, appended claims, and accompanying drawings where FIG. 1a is a schematic diagram showing a preferred architectural structure of the composite device of this invention.

IV. DETAILED DESCRIPTION OF THE INVENTION

In accordance with the present invention, a guided wave amplifier which maintains the gain achievable at the ytterbium-doped YAG signal wavelength, as known in prior art, but in a different host crystalline medium, is provided. Using different crystalline medium, described above, facilitates the manufacturing process and lowers the cost.

Figure 1A:
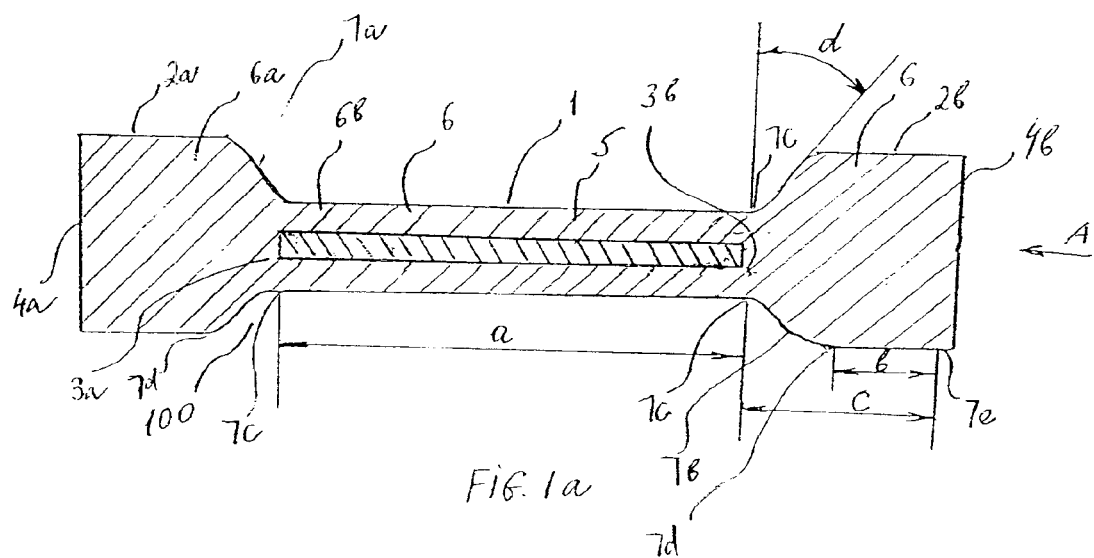
FIG. 1b is a schematic diagram showing an end view of the structure depicted on FIG. 1a, when looked at in direction A.
Figure 1B:
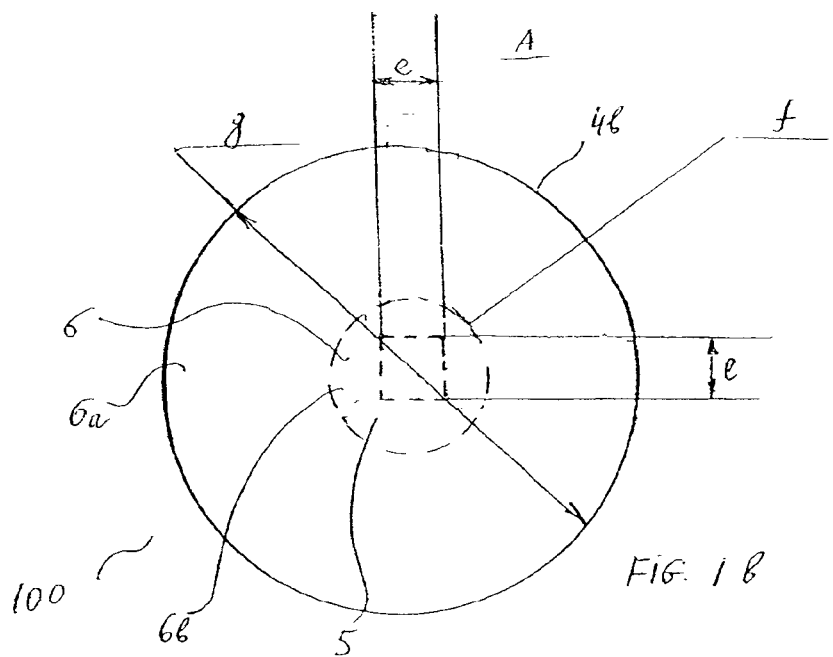

FIG. 1a shows a preferred architectural structure of the composite device of this invention, and FIG. 1b depicts an end view of the structure shown on FIG. 1a, when looked at in direction A.

The device 100 comprises a preferably cylindrical central section 1 and two substantially identical end sections 2a and 2b, which are also preferably cylindrical.

Each of these end sections 2a and 2b has an inner side 3a and 3b, respectively, and an end face 4a and 4b, respectively. End faces 4a and 4b are normally fabricated at an angle away from normal to the core rod axis; this angle is calculated according to methods known to those skilled in the art and is large enough that Fresnel reflections from the air/crystal interface cannot couple into the core 5. It is usual but not essential that the ends of the core 5 be normal to the rod axis.

Between the central section 1 and each of the end sections 2a and 2b, there lie two substantially identical "bottleneck" sections 7a and 7b, respectively. Each "bottleneck" section 7a and 7b has a diameter which progressively increases, from its lowest value at the point 7c (where the "bottleneck" section 7a or 7b touches the central section 1) to its highest value at the point 7d (where the "bottleneck" section 7a or 7b merges into the end section 2a or 2b, respectively).

Each of the inner faces 3a and 3b is preferably circular in cross-section and is diffusion-bonded to the central section 1 so that the central section 1 is integral with said the end sections 2a and 2b. Each of the end faces 4a and 4b is preferably circular or elliptical.

The central section 1 is comprised of a core 5, said core 5 being completely ensconced in cladding 6. The core 5 is a rod, polygonal in cross-section, preferably a square, as shown on FIG. 1b. Those skilled in the art will realize, that depending on the refractive index difference between the cladding and the core, various polygonal forms can be used.

This rod, forming the core 5, therefore, in the preferred embodiment, preferably has four sides and two ends, a total of six surfaces, and extends lengthwise throughout the central section 1.

Cladding 6 comprises both the cladding's portion 6a of which end sections 2a and 2b are made and the cladding's portion 6b, enveloping the core 5 in the central section 1.

The core 5 is fabricated of crystalline or a glass material, preferably, LuAG, doped with the trivalent ion of ytterbium, $Yb^{3+}$, and the cladding 6 is preferably fabricated of clear undoped YAG.

Therefore, the preferred embodiment of this invention comprises a device having the ytterbium-doped LUAG core and YAG cladding. Those skilled in the art will realize that other combinations of the core and of the cladding materials can be chosen. The criteria for the selection of the materials are as follows:

1. The properties of the materials of the core and of the cladding should match.
2. Such end caps should be used that the beam size at the air-crystal interface is larger than the size in the core.
3. The doped core should be made of a material having slightly higher refractive index than the material of the cladding.
4. Spectral characteristics of the materials should be appropriately chosen.
5. Thermal expansion of the material of the core should be slightly higher than that of the material of the cladding.

Using the foregoing criteria, selection of materials for the core and for the cladding may lead to a choice of materials comprising a neodymium-doped LUAG core/YAG cladding combination or a thulium-doped LUAG core/YAG cladding combination, in addition to the ytterbium-doped LUAG core/YAG cladding combination. Garnets other than YAG can be used, but YAG is a preferred garnet in terms of combination of properties as well as availability.

The garnet used in the preferred embodiment of the invention is similar to YAG used in prior art, but its use does not bring about any drawbacks and disadvantages inherent in YAG which were discussed hereinabove. However, same pump diodes which are used in ytterbium-doped YAG cores of prior art can be used with ytterbium-doped LUAG core of this invention and the gain achieved at ytterbium-doped YAG wavelength is similar as well.

The preferred embodiment of this invention is depicted on FIGS. 1a and 1b. It is fabricated by using common methods known to those skilled in the art, preferably, by diffusion bonding techniques.

The choice of materials of the core and cladding in the preferred embodiment makes the device significantly easier to fabricate using the above-mentioned ordinary diffusion bonding techniques. It does not require special polishing needed in case of sapphire/YAG composites and enables complete encasement which is extraordinarily difficult, if at all possible, to achieve for sapphire. The finished product of the preferred embodiment is also superior to one made with sapphire in that is has birefringence-free end caps.

As mentioned above, the material of the cladding 6 should preferably be matched to the material of the core 5 forming the laser medium in terms of respective thermal linear expansion coefficients, the cladding material preferably having somewhat higher thermal conductivity and Young's modulus than those of the core material, for better thermomechanical heat sinking characteristics. The cladding material with higher thermal conductivity helps to reduce temperature at laser medium interface and, therefore, to lower overall temperature in the core 5.

The composition of the preferred embodiment, ytterbium $Yb^{3+}$-doped LuAG material for the core 5 and clear undoped YAG for the cladding 6, satisfies the requirements of the thermal and mechanical properties of the materials of the cladding 6 and of the core 5 discussed above. In addition, the refractive indices of LuAG and YAG are close, LuAG having somewhat higher refractive index, so that guiding can occur with LuAG as the core medium. The resulting numerical aperture (NA) is calculated according to a formula $(n_{core}^2 - n_{cladding}^2)^{1/2}$ or $(1.83^2 - 1.82^2)^{1/2}$ and is about 0.19, which is an excellent number for NA.

The relevant thermomechanical properties as well as refractive indices for YAG and LuAG are summarized in Table 1. The comparison data for sapphire are also given.

TABLE 1

COMPARISON OF THERMOMECHANICAL PROPERTIES AND REFRACTIVE INDICES OF YAG AND LUAG

| Material | Thermal Conductivity, W/m/K | Young Modulus E, GPa | Thermal Linear Expansion Coefficient (1/K) | Refractive Index, $n_D$, at 1 μm |
|---|---|---|---|---|
| Sapphire | ~35 | 405 | $5.4 \times 10^{-6}$//a axis $6.8 \times 10^{-6}$//c axis | 1.76 |
| YAG | 10 | 282 | $7.0 \times 10^{-6}$ | 1.82 |
| LuAG | 9 | 300 | $8.8 \times 10^{-6}$ | 1.83 |

In order to maintain a reasonable absolute temperature, T, in the LuAG core, dimensions of the portions of this device are very important. The set of the acceptable and the preferred dimensions is summarized in Table 2.

TABLE 2

TYPICAL DIMENSIONS OF PORTIONS OF THE STRUCTURE OF THIS INVENTION (PREFERRED EMBODIMENT)

| Portion of the Device | Dimension shown as on FIGS. 1a or 1b | Dimension, within a range of | Dimension, preferred |
|---|---|---|---|
| Central section 1 | "a" on FIG. 1a | Between about 23 and about 25 mm | 24 mm |
| Between point 7d of the end of the "bottleneck" section 7a or 7b and point 7e* | "b" on FIG. 1a | Between about 2.4 and about 2.6 mm | 2.5 mm |
| Between point 7c of the beginning of the "bottleneck" section 7a or 7b and point 7e* | "c" on FIG. 1a | Between about 6 mm and about 8 mm | 6.5 mm |
| The sloping angle between the central section 1 and the "bottleneck" section 7a or 7b | "d" on FIG. 1a | Less than 45° | Less than 45° |
| Side of the core 5, in cross section** | "e" on FIG. 1b | Between about 0.5 mm and about 1.5 mm | 1.0 mm |
| Diameter of the central section 1** | "f" on FIG. 1b | Between about 1.5 mm and about 2.5 mm | 2.0 mm |
| Diameter of the end sections 2a and 2b** | "g" on FIG. 1b | Between about 6 mm and about 7 mm | 6.0 mm |

Comments.
*The point 7e lies between about 0.05 mm and about 0.1 mm from the end face 4a or 4b, and the chamfer is formed between the point 7e and the end face.
**This square and two circles are substantially concentric, each having the center in the same point, with possible deviation for each center being within about 0.2 mm.

From the dimensions presented in Table 2 above, the dimension of the "bottleneck" section 7a or 7b can be easily calculated as being within a range of between about 3.8 mm and about 4.2 mm, preferably, about 4.0 mm.

Other limitations to the preferred structure of this invention comprise the following:

(a) the end faces 4a and 4b are tilted to between about 1° and about 3°, preferably, about 2°, from the perfectly vertical position, the end faces 4a and 4b being substantially parallel to each other, to within about 1°;

(b) all diffusion bonded interfaces (e.g., between the inner surface of the cladding 6 and the outer surface of the core 5) are substantially free of gaps, voids, inclusions and like mechanical imperfections;

(c) the outer surface of the central section 1 is polished to reach a commercial grade degree of smoothness;

(d) all other outer surfaces, other than the end surfaces 4a and 4b, are polished to a rough grind of about 400 grit; and (e) the end surfaces 4a and 4b are subjected to more thorough polishing and are then coated as described below.

The end surfaces 4a and 4b are polished to achieve a surface as provided by military specification MIL-0-1380. The surfaces 4a and 4b are then coated with the an anti-reflecting coating having properties in accordance with military specification MIL-C-48497, except for humidity requirements. Both military specifications are incorporated herein by reference.

The coating can be optionally, but not mandatorily, applied to the end chamfers. The coating must be able to withstand a flux density of at least 100 MW/cm$^2$.

Figure 2:
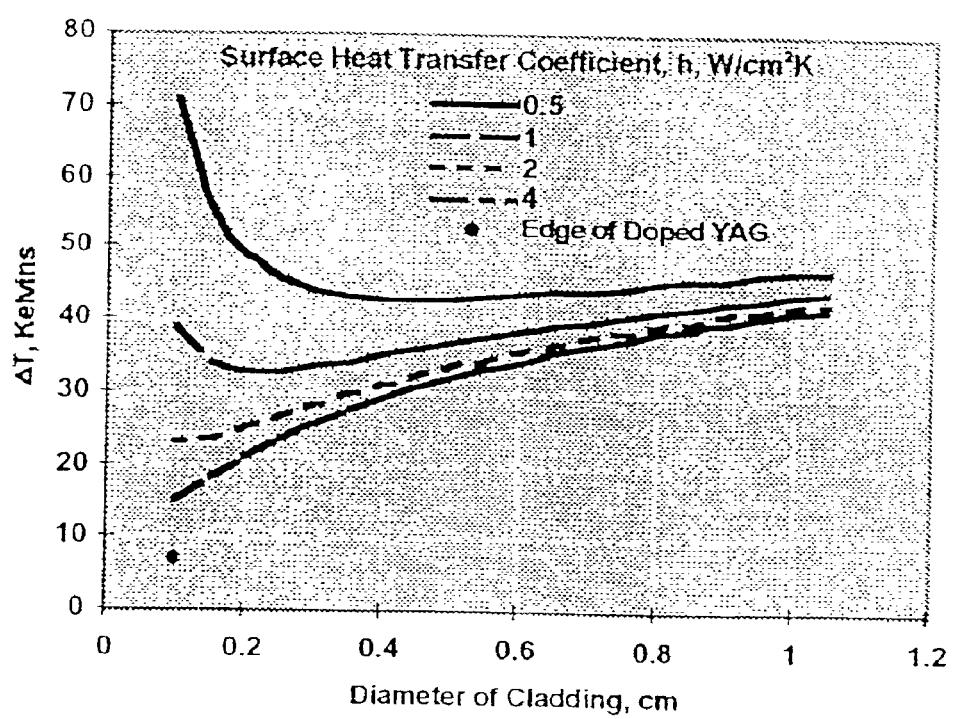
FIG. 2 is a chart showing a results of thermal analysis of various active cores.

The device creates a favorable thermal situation arising when the LuAG core absorbs the pump light and heats up internally. FIG. 2 is a graph of thermal analysis, showing the change in temperature of the active core ($\Delta T$) as a function of the outer diameter of the cladding. The heat transfer coefficient of water cooling at the surface of the cladding was also used as a variable parameter in order to illustrate advantages of the invention.

Because the LuAG core is hotter that the YAG cladding, and also because the LuAG linear thermal expansion coefficient is higher than that of the YAG cladding, the LuAG core expands relative to the YAG cladding. As a result, the LuAG core is under compressive stress during the pumping.

The above described situation, when the core is under compressive stress is preferred to the situation when the core is under the tensile stress (e.g., when the core shrinks relative to the cladding), when the core is subject to thermally induced failure, as the surrounding YAG cladding expands and destroys the LuAG core. The composition of the structure of this invention takes advantage of physical and thermomechanical properties of YAG and LuAG and avoids the extremely undesirable situation when the core is under tensile stress.

Having described the invention in connection with several embodiments thereof, modification will now suggest itself to those skilled in the art. As such, the invention is not to be limited to the described embodiments except as required by the appended claims.

We claim:

1. A solid state waveguided structure, comprising:
    (a) a core fabricated of a lutetium-aluminum-garnet material doped with ions, said core having an outer surface; and
    (b) a cladding fabricated of a laser-inactive material, said cladding diffusion-bonded to said outer surface of said core.

2. The structure as claimed in claim 1, wherein said structure comprises:
    (a) a central section having a first end and a second end, said first end being terminated at a first bottleneck section and said second end being terminated at a second bottleneck section; and
    (b) two substantially identical end sections, a first end section and a second end section, wherein said first end section is associated with said first bottleneck section, and said second end section is associated with said second bottleneck section, thereby making said end sections integral with said central section.

3. The structure as claimed in claim 1, wherein said core comprises a rod, said rod having a polygonal cross-section.

4. The structure as claimed in claim 1, wherein said laser-inactive material further comprises yttrium-aluminum-garnet material.

5. The structure as claimed in claim 1, wherein said ions are selected from a group comprising ytterbium, neodymium, or thulium.

6. The structure as claimed in claim 2, wherein said central section is substantially in a form of a cylinder.

7. The structure as claimed in claim 2, wherein each of said end sections is substantially in a form of a cylinder.

8. The structure as claimed in claim 2, wherein a combined length of said first bottleneck section and of said first end section is between about 6 millimeters and about 8 millimeters.

9. The structure as claimed in claim 3, wherein said polygonal cross-section is substantially in a form of a square.

10. The structure as claimed in claim 6, wherein said cylinder has a diameter between about 1.5 millimeters and about 2.5 millimeters.

11. The structure as claimed in claim 7, wherein said cylinder has a diameter between about 6 millimeters and about 7 millimeters.

12. The structure as claimed in claim 9, wherein said square has a dimension of a side between about 0.5 millimeters and about 1.5 millimeters.

13. A method of fabricating a solid state waveguided structure with improved characteristics, comprising:
    (a) providing a core fabricated of a lutetium-aluminum-garnet material doped with ions, said core having an outer surface; and
    (b) ensconcing said core in a cladding fabricated of a laser-inactive material, said cladding diffusion-bonded to said outer surface of said core.

14. The method as claimed in claim 13, wherein said structure comprises:
    (a) a central section having a first end and a second end, said first end being terminated at a first bottleneck section and said second end being terminated at a second bottleneck section; and
    (b) two substantially identical end sections, a first end section and a second end section, wherein said first end section is associated with said first bottleneck section, and said second end section is associated with said second bottleneck section, thereby making said end sections integral with said central section.

15. The method as claimed in claim 13, wherein said core comprises a rod, said rod having a polygonal cross-section.

16. The method as claimed in claim 13, wherein said laser-inactive material further comprises a yttrium-aluminum-garnet material.

17. The method as claimed in claim 13, wherein said ions are selected from a group comprising ytterbium, neodymium, or thulium.

18. The method as claimed in claim 14, wherein said central section is substantially in a form of a cylinder.

19. The method as claimed in claim 14, wherein each of said end sections is substantially in a form of a cylinder.

20. The method as claimed in claim 14, wherein a combined length of said first bottleneck section and of said first end section is between about 6 millimeters and about 8 millimeters.

21. The method as claimed in claim 15, wherein said polygonal cross-section is substantially in a form of a square.

22. The method as claimed in claim 18, wherein said cylinder has a diameter between about 1.5 millimeters and about 2.5 millimeters.

23. The method as claimed in claim 19, wherein said cylinder has a diameter between about 6 millimeters and about 7 millimeters.

24. The method as claimed in claim 21, wherein said square has a dimension of a side between about 0.5 millimeters and about 1.5 millimeters.

25. The structure as claimed in claim 1, wherein said cladding envelops all of said core.

26. The method as claimed in claim 13, wherein said cladding envelops all of said core.

\* \* \* \* \*